Sept. 22, 1925.  M. J. TRUMBLE  1,554,471
GAS TRAP
Filed April 16, 1923
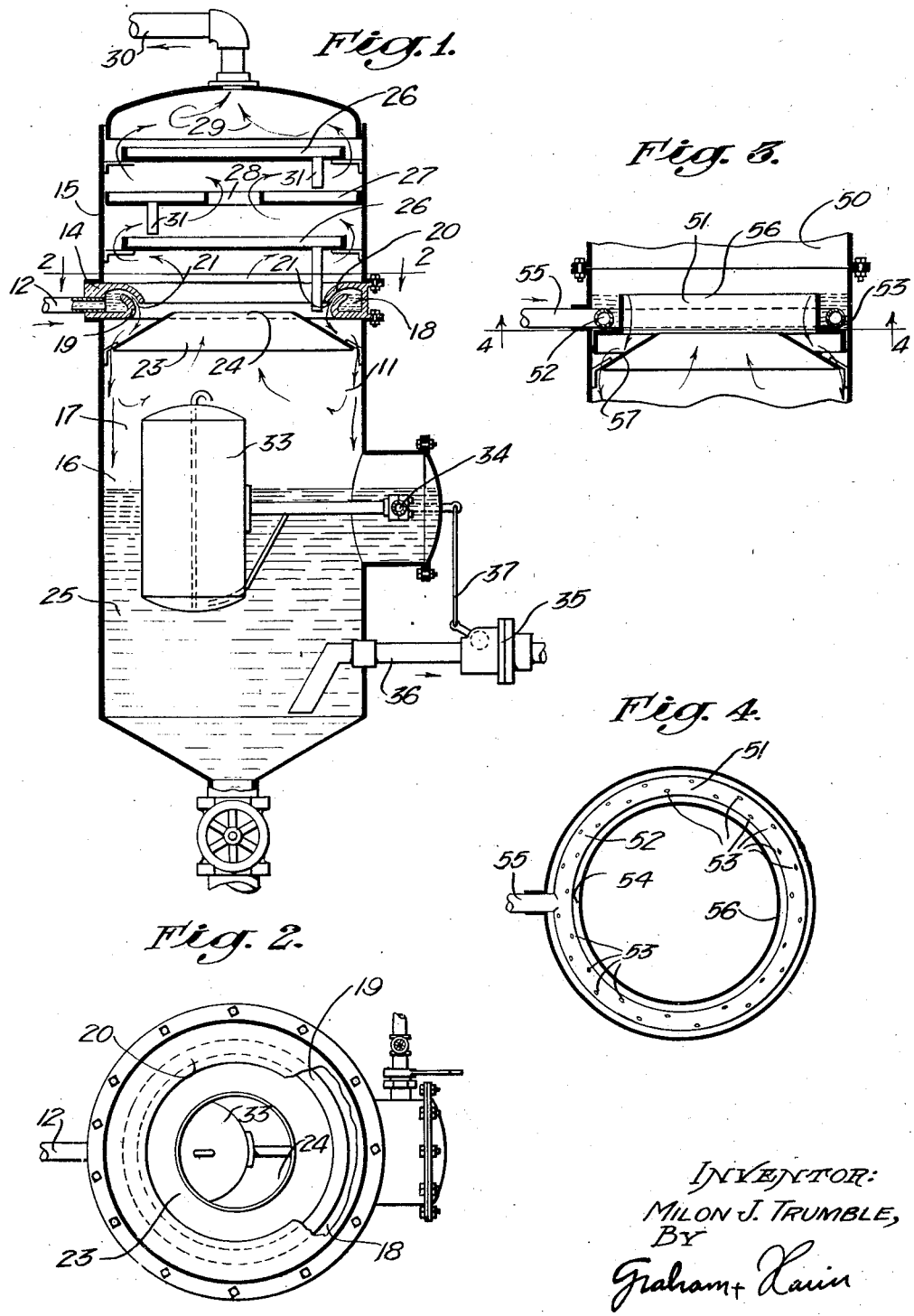
INVENTOR:
MILON J. TRUMBLE,
BY
Graham + Lain
ATTORNEYS.

Patented Sept. 22, 1925.

1,554,471

UNITED STATES PATENT OFFICE.

MILON J. TRUMBLE, OF LOS ANGELES, CALIFORNIA, ASSIGNOR TO TRUMBLE GAS TRAP CO., OF LOS ANGELES, CALIFORNIA, A COPARTNERSHIP CONSISTING OF MILON J. TRUMBLE, FRANCIS M. TOWNSEND, AND ALFRED J. GUTZLER.

GAS TRAP.

Application filed April 16, 1923. Serial No. 632,286.

*To all whom it may concern:*

Be it known that I, MILON J. TRUMBLE, a citizen of the United States, residing at Los Angeles, in the county of Los Angeles and State of California, have invented a new and useful Gas Trap, of which the following is a specification.

This invention relates to the oil producing industries, and relates particularly to an improved form of gas apparatus.

Oil from the wells contains a considerable amount of natural gas, which is a valuable by-product inasmuch as it may be used as fuel at the well, or piped to various localities where it may be used.

To remove this natural gas from the oil, the oil is directed through a gas trap, at which time the gas is separated from the oil; the gas being directed through one pipe and the oil through another pipe, to their respective storage tanks.

It is an object of the invention to provide an improved form of gas trap which will separate the gas from the oil more efficiently. This is accomplished by providing an improved form of oil distributer, which will distribute the oil evenly over a large area and thereby facilitate the separation of the gas therefrom.

It is a further object of the invention to provide an improved form of gas trap which will produce a very thorough separation of natural gas from the oil. This is done by directing the gas, after it has been separated from the oil, through a series of tray members which will remove any particles of oil which are carried in the gas, and thereby accomplish a very thorough separation of the gas from the oil.

Additional advantages of the invention and further objects thereof will be made evident hereinafter.

Referring to the drawing, which is for illustrative purposes only:

Fig. 1 is a vertical sectional view of a preferred form of my invention.

Fig. 2 is a section taken as indicated by the line 2—2 of Fig. 1.

Fig. 3 is a fragmentary section illustrating an alternative form of distributer which may be used to accomplish the hereinbefore mentioned results.

Fig. 4 is a section taken on the plane represented by the line 4—4 of Fig. 3.

As shown in Fig. 1, 11 represents a gas trap into which oil containing natural gas characteristics is introduced through a pipe 12, the oil first flowing into an annular distributer 14 which is bolted between the sections 15 and 16 which comprise the shell 17 of the gas trap 11.

The distributer 14 provides an annular channel 18 into which the oil circulates and has an over-flow wall 19. Over the channel 18 extends an inwardly projecting and a downwardly curved lip 21, which extends to a point inside the wall 19 and below the top thereof, as shown. This construction forms a restricting over-flow channel 21 through which the oil must pass upon over-flowing from the channel 18. It will readily be seen that by providing a restricting over-flow 21, as shown, that the flow of oil therethrough will be evenly distributed therearound, because of the fact that the channel 21 allows only a limited amount of oil to pass therethrough at any one point.

After passing through the over-flow channel 21 the oil drops onto a conical deflector 23 and is directed thereby down the side of the shell 17, the oil being in a thin film and covering an extensive area. The gas at this time will rise upwardly through the opening 24 in the deflector 23 and the oil will continue downwardly into the body of oil 25 which fills the lower part of the shell 11.

In the upper section 15 of the shell 11, interceptor pans 26 and 27 are alternately placed; the pan 26 being smaller in diameter than the shell 11 and the pan 27 being the full size thereof but having an opening 28 through the center thereof.

The gas, passing upwardly, as indicated by the arrow 29, must circulate around the pan 26 and through the opening in the pan 27 and then around the upper pan 26, after which the gas may flow through the outlet 30.

Owing to the comparatively small area of the outlet opening through the pipe relative to the area of the shell 11, the gas travels at a slow rate of speed between the interceptor pans and, being brought into contact with these pans, is relieved of any particles of oil or heavy characteristics; the oil collected therefrom may drop in the shell 11 through the drip pipes 31 located in the pans 26 and 27.

The body of oil 25 is maintained at a certain level in the shell 17 by the float 33 which pivots on a shaft 34 and which is connected to valve 35 located in the oil outlet 36 through the link 37. The rising or lowering of the float 33 opens or closes the valve 35, in accordance with the inflow of oil through the inlet 12, if the oil flows into the tank at a higher rate of speed than usual, the level of the body of oil 25 will rise and thereby raise the float 33, which will open the valve 35 more, allowing the oil to flow from the tank at approximately the same rate of speed as it enters therein.

In Figs. 3 and 4 is illustrated an alternative form of distributer, in which figures 50 presents the shell of a gas trap which has a distributer 51 mounted therein. This distributer consists of an annular pipe 52 which has oil outlet holes 53 in the lower side thereof and which rests in a circular channel 54, as shown. The oil, entering through a pipe 55, circulates through the pipe 52, flowing through the hole 53 and filling the channel 54. The oil will over-flow the wall 56 thereof and flow down over a deflector 57 in the same manner as previously described.

The use of an annular distributer of either of the types shown provides a very even distribution of oil in a thin film over the surface of the cone and the inner wall of the shell 11. By flowing the incoming oil in a thin film, it is possible to release the gas therefrom substantially completely, thus maintaining a quiet non-effervescing body of oil 25 in the bottom of the shell. The annular distributer provides a simple and effective means for spreading the flow of oil over a maximum area, with the result that a very thin film is produced.

I claim as my invention:

1. In a gas trap: a distributor comprising a loop channel adapted to discharge a gas-oil mixture in a stream extending around said channel.

2. In a gas trap: a distributor comprising a loop channel adapted to discharge a gas-oil mixture in a comparatively thin and uniform stream extending around said distributor.

3. In a gas separator, the combination of: a shell having a cylindrical side wall and having a gas outlet at the top thereof and an oil outlet at the bottom; means for regulating the flow of oil through said outlet; annular distributing means for delivering a flow of oil in a substantially fully circular film down the surface of the side wall of said shell; and an inlet for feeding oil to said distributing means.

4. In a gas separator, the combination of: a shell having a cylindrical side wall and having a gas outlet at the top thereof and an oil outlet at the bottom; means for regulating the flow of oil through said outlet; an annular distributing member for delivering a substantially fully circular film of oil; means for deflecting this film of oil against a cylindrical wall to prevent the coalescing of the oil film into drops; and an oil inlet for feeding oil to said distributing means.

5. In a gas separator, the combination of: a shell having a cylindrical side wall and having a gas outlet at the top thereof and an oil outlet at the bottom; means for regulating the flow of oil through said outlet; an annular distributing member for delivering a substantially fully circular film of oil; means for deflecting this film of oil against interior cylindrical wall of said shell to prevent the coalescing of the oil film into drops; and an oil inlet for feeding oil to said distributing means.

6. In a gas separator, the combination of: a shell having a cylindrical side wall and having a gas outlet at the top thereof and an oil outlet at the bottom; means for regulating the flow of oil through said outlet; an annular distributing member for delivering a substantially fully circular film of oil; an annular deflector member for deflecting this film of oil against interior cylindrical wall of said shell to prevent the coalescing of the oil film into drops; and an oil inlet for feeding oil to said distributing means.

7. In a gas separator, the combination of: a shell having a gas outlet at the top thereof and an oil outlet at the bottom; means for regulating the flow of oil through said outlet; interceptor plates between which outflowing gas is directed at a slow rate of travel; and means for delivering a flow of oil in a substantially unbroken film down the entire encircling surface of the side wall of said shell.

8. In a gas separator, the combination of: a shell having a cylindrical side wall and having a gas outlet at the top thereof and an oil outlet at the bottom; means for regulating the flow of oil through said outlet; interceptor plates between which outflowing gas is directed at a slow rate of travel; an annular distributing member for delivering a substantially fully circular film of oil; means for deflecting this film of oil against interior cylindrical wall of said shell to prevent the coalescing of the oil film into drops; and an oil outlet for feeding oil to said distributing means.

9. In a gas separator, the combination of: a shell having a gas outlet at the top thereof and an oil outlet at the bottom; means for regulating the flow of oil through said outlet; interceptor plates between which outflowing gas is directed at a slow rate of travel, said interceptor plates having upwardly turned edges to prevent overflow of collected oil particles; downspouts for carrying the collected oil down from said interceptor plates; an annular distributing member for delivering a substantially fully circular film of oil; means for deflecting this film of oil against interior cylindrical wall of said shell to prevent the coalescing of the oil film into drops; and an oil outlet for feeding oil to said distributing means.

10. In a gas trap: a distributor comprising a loop channel adapted to discharge a gas-oil mixture in a stream extending around said channel; and means for supplying said mixture to said channel to cause said mixture to overflow said channel.

11. In a gas trap: a distributor comprising a loop channel adapted to discharge a gas-oil mixture in a stream extending around said channel; and a distributor plate adapted to receive said mixture from said channel.

12. In a gas trap: a distributor comprising a loop channel adapted to discharge a gas-oil mixture in a stream extending around said channel; a distributor plate adapted to receive said mixture from said channel; and a shell, said distributor plate being adapted to direct the gas-oil mixture against the interior of said shell.

13. In a gas trap: a distributor comprising a loop channel adapted to discharge a gas-oil mixture in a stream extending around said channel; a distributor plate adapted to receive said mixture from said channel; a shell, said distributor plate being adapted to direct the gas-oil mixture against the interior of said shell; and baffle plates in said shell against which move the gases released from said mixture and oil particles entrained by said gases.

14. In a gas trap: a distributor comprising a loop channel adapted to discharge a gas-oil mixture in a stream extending around said channel; a distributor plate adapted to receive said mixture from said channel; a shell, said distributor plate being adapted to direct the gas-oil mixture against the interior of said shell, said shell having a gas outlet and an oil outlet; and means for regulating the oil flow through said outlet.

15. In a gas trap: a distributor for an oil-gas mixture, said distributor functioning as a reservoir; and means for supplying said mixture to said reservoir to cause said mixture to continuously overflow said reservoir in a stream extending around said reservoir.

16. In a gas trap: a distributor comprising a reservoir; means for supplying a gas-oil mixture to said distributor, said distributor having an opening therearound through which said mixture may flow in a comparatively thin and uniformly distributed stream.

17. In a gas trap: a shell; a distributor in said shell, said distributor comprising a reservoir extending around said shell; and means for supplying said mixture to said reservoir, said distributor having an orifice extending therearound through which may pass the overflow from said reservoir.

18. The combination claimed in claim 17 in which said orifice is of comparatively small cross sectional area.

19. In a gas trap: a shell; a distributor for receiving and holding a mixture of oil and gas, said distributor comprising a reservoir extending around said shell interiorly therof; and means for supplying said mixture to said reservoir, said distributor having a substantially continuous restricted orifice extending therearound, said orifice being an outlet for the overflow of the oil-gas mixture from said channel.

20. In a gas trap: a shell; a distributor for receiving and holding a mixture of oil and gas, said distributor comprising a reservoir extending around said shell interiorly thereof; and means for supplying said mixture to said reservoir, said distributor having a substantially continuous restricted orifice extending therearound, said orifice being an outlet for the overflow of the oil-gas mixture from said channel, and formed by overlapping spaced wall portions of said distributor.

In testimony whereof, I have hereunto set my hand at Los Angeles, California, this 9th day of April 1923.

MILON J. TRUMBLE.